(12) United States Patent
Xiao

(10) Patent No.: US 11,237,430 B2
(45) Date of Patent: Feb. 1, 2022

(54) DISPLAY MODULE

(71) Applicant: WUHAN CHINA STAR OPTOELECTRONICS TECHNOLOGY CO., LTD., Wuhan (CN)

(72) Inventor: Shiyuan Xiao, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 238 days.

(21) Appl. No.: 16/620,541

(22) PCT Filed: Sep. 27, 2019

(86) PCT No.: PCT/CN2019/108546
§ 371 (c)(1),
(2) Date: Dec. 9, 2019

(87) PCT Pub. No.: WO2020/237951
PCT Pub. Date: Dec. 3, 2020

(65) Prior Publication Data
US 2021/0278725 A1    Sep. 9, 2021

(30) Foreign Application Priority Data

May 30, 2019   (CN) .......................... 201910463249.9

(51) Int. Cl.
*G02F 1/13357* (2006.01)
*G02F 1/1335* (2006.01)
(Continued)

(52) U.S. Cl.
CPC ...... *G02F 1/133608* (2013.01); *G02F 1/1339* (2013.01); *G02F 1/133311* (2021.01);
(Continued)

(58) Field of Classification Search
CPC ....... G02F 1/133308–133334; G02F 1/133306
See application file for complete search history.

(56) References Cited

U.S. PATENT DOCUMENTS

2007/0221943 A1* 9/2007 Moriya ............. G02F 1/133603
257/99
2011/0050612 A1* 3/2011 Matsumoto ............ G06F 3/041
345/173
(Continued)

FOREIGN PATENT DOCUMENTS

CN           1303021 A  *  7/2001  ....... G02F 1/133308
CN         204117503 U  *  1/2015  ............... H05K 5/03
(Continued)

*Primary Examiner* — Mariceli Santiago
(74) *Attorney, Agent, or Firm* — Osha Bergman Watanabe & Burton LLP

(57) ABSTRACT

A display module is provided, which provides a first sealing structure disposed between a flexible circuit board and a surface of a cover plate facing a backlight housing and a second sealing structure disposed between the flexible circuit board and a surface of a side wall of the backlight housing facing the cover plate. It can isolate the external water vapor and dust from entering the interior of the display module, thereby improving the dustproof and waterproof capabilities of the display module, and further improving the reliability of the display module.

17 Claims, 2 Drawing Sheets

(51) Int. Cl.
*G02F 1/1333* (2006.01)
*G02F 1/1339* (2006.01)

(52) U.S. Cl.
CPC .. *G02F 1/133514* (2013.01); *G02F 1/133531* (2021.01); *G02F 1/133605* (2013.01); *G02F 1/133606* (2013.01)

(56) References Cited

U.S. PATENT DOCUMENTS

2018/0011367 A1* 1/2018 Tanaka ................ B32B 5/22
2019/0049772 A1* 2/2019 Chen ................ G02F 1/1303

FOREIGN PATENT DOCUMENTS

| JP | 2013088527 A | * | 5/2013 | ....... G02F 1/133308 |
|----|--------------|---|--------|------------------------|
| KR | 20080035784 A | * | 4/2008 | |
| KR | 20160049105 A | * | 5/2016 | |
| KR | 20160051401 A | * | 5/2016 | |

* cited by examiner

DISPLAY MODULE

FIELD OF INVENTION

The present application relates to a field of in-vehicle display technologies, and in particular, to a display module for a vehicle.

BACKGROUND OF INVENTION

With development of display panel technology and automotive technology, low-temperature poly-silicon (LTPS) display modules are widely used in the automotive field due to their narrow bezel characteristics. Therefore, reliability requirements of vehicle LTPS display modules are also getting higher and higher.

Technical Problem

In current vehicle LTPS display modules, a cover is fixed to the display module by fixing tape. However, there is a gap at an edge of the fixing tape, so that water vapor, dust, and the like easily enter an interior of the display module from the gap, thus affecting the reliability of the display module.

SUMMARY OF INVENTION

Technical Solution

An embodiment of the present application provides a display module, which can improve the reliability of the display module.

An embodiment of the present application provides a display module, including a backlight housing comprising a bottom wall and a side wall, the bottom wall and the side wall enclosed as an accommodation space; a backlight module received in the accommodation space; a bracket disposed in the backlight housing and disposed at a side of the backlight module; a display panel disposed on the bracket; a cover plate disposed on the display panel, wherein a gap is provided between a surface of the cover plate facing the backlight housing and a surface of the side wall of the backlight housing facing the cover plate; a flexible circuit board electrically connected to the display panel through the gap; a first sealing structure disposed between the flexible circuit board and the surface of the cover plate facing the backlight housing; and a second sealing structure disposed between the flexible circuit board and the surface of the side wall of the backlight housing facing the cover plate.

In a display module provided by the embodiment of the present application, a side of the first sealing structure close to the flexible circuit board and a side of the first sealing structure close to the surface of the cover plate facing the backlight housing are sticky.

In a display module provided by the embodiment of the present application, a side of the second sealing structure close to the flexible circuit board and a side of the second sealing structure close to the surface of the side wall of the backlight housing facing the cover plate are sticky.

In a display module provided by the embodiment of the present application, the bracket comprises a first support portion and a second support portion, the first support portion is inserted into the accommodation space and abuts against to the bottom wall, and the second support portion is disposed on a side of the first support portion away from the bottom wall and extends toward the display panel.

In a display module provided by the embodiment of the present application, the first support portion is disposed in parallel with the side wall of the backlight housing.

In a display module provided by the embodiment of the present application, the first support portion and the second support portion are disposed perpendicular to each other.

In a display module provided by the embodiment of the present application, further comprising a fixing tape disposed between the second support portion and the display panel.

In a display module provided by the embodiment of the present application, the display panel comprises a lower polarizer, a thin film transistor substrate, a liquid crystal layer, a color filter substrate, and an upper polarizer sequentially stacked from bottom to top, and the flexible circuit board is electrically connected to the thin film transistor substrate.

In a display module provided by the embodiment of the present application, the second sealing structure is stretchable, a thickness of the second sealing structure is greater than or equal to a sum of a thickness of the fixing tape, a thickness of the lower polarizer, and a thickness of the thin film transistor substrate.

In a display module provided by the embodiment of the present application, further comprising an optical adhesive disposed between the display panel and the cover plate.

In a display module provided by the embodiment of the present application, the first sealing structure is stretchable, and a thickness of the first sealing structure is greater than or equal to a sum of a thickness of the color filter substrate, a thickness of the liquid crystal layer, a thickness of the upper polarizer, and a thickness of the optical adhesive.

In a display module provided by the embodiment of the present application, the backlight module is attached to the bottom wall of the backlight housing, and an interspace is provided between the backlight module and the bracket.

In a display module provided by the embodiment of the present application, the first sealing structure is a sealed foam.

In a display module provided by the embodiment of the present application, the second sealing structure is a sealed foam.

In a display module provided by the embodiment of the present application, the backlight module comprises a reflective sheet, a light guide plate, and a brightness enhancement film sequentially stacked from bottom to top.

In a display module provided by the embodiment of the present application, the brightness enhancement film comprises a lower diffusion sheet, a lower brightness enhancement sheet, an upper brightness enhancement sheet, and an upper diffusion sheet sequentially stacked from bottom to top.

Beneficial Effect

The display module provided by the embodiment of the present invention includes a backlight housing comprising a bottom wall and a side wall, the bottom wall and the side wall enclosed as an accommodation space; a backlight module received in the accommodation space; a bracket disposed in the backlight housing and disposed at a side of the backlight module; a display panel disposed on the bracket; a cover plate disposed on the display panel, wherein a gap is provided between a surface of the cover plate facing the backlight housing and a surface of the side wall of the backlight housing facing the cover plate; a flexible circuit board electrically connected to the display panel through the gap; a first sealing structure disposed between the flexible circuit board and the surface of the cover plate facing the backlight housing; and a second sealing structure disposed between the flexible circuit board and the surface of the side wall of the backlight housing facing the cover plate. The present invention provides a first sealing structure disposed between the flexible circuit board and the surface of the cover plate facing the backlight housing, and a second sealing structure disposed between the flexible circuit board and the surface of the side wall of the backlight housing facing the cover plate. The gaps of the cover can be completely sealed, and external water vapor and dust are insulated from entering an interior of the display module, thereby improving the dustproof and waterproof capabilities of the display module, and further improving the reliability of the display module.

DETAILED DESCRIPTION OF EMBODIMENTS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art can obtain the other drawings without any creative effort.

An embodiment of the present application provides a display module, which will be described in detail below.

Figure 1:
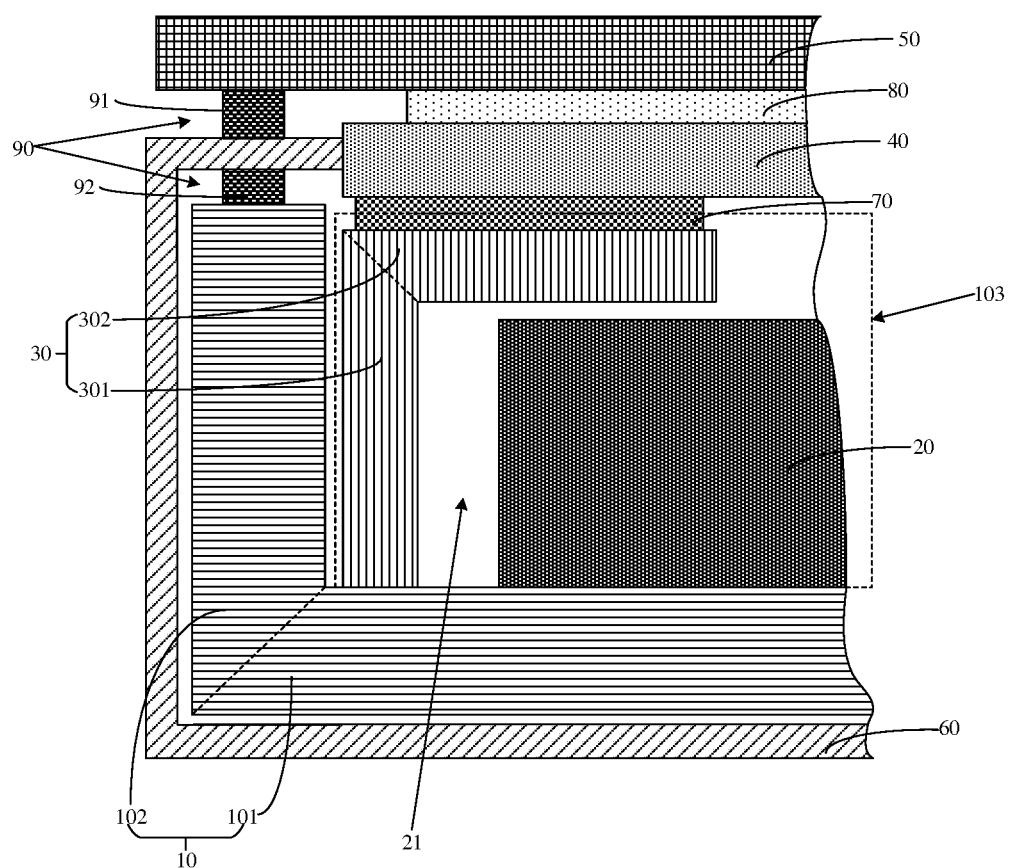
FIG. 1 is a schematic structural diagram of a display module according to an embodiment of the present application.

Please refer to FIG. 1, FIG. 1 is a schematic structural diagram of a display module according to an embodiment of the present application. The display module 1 can include a backlight housing 10, a backlight module 20, a bracket 30, a display panel 40, a cover plate 50, a flexible circuit board 60, a first sealing structure 91, and a second sealing structure 92. It should be noted that the display module 1 includes but is not limited to the above components, and the display component 10 can further include other components, such as a control chip or the like.

The backlight housing 10 can include a bottom wall 101 and a side wall 102. The bottom wall 101 and the side wall 102 can be enclosed as an accommodation space 103. The bottom wall 101 can be used to place the backlight module 20 and the bracket 30.

Figure 2:
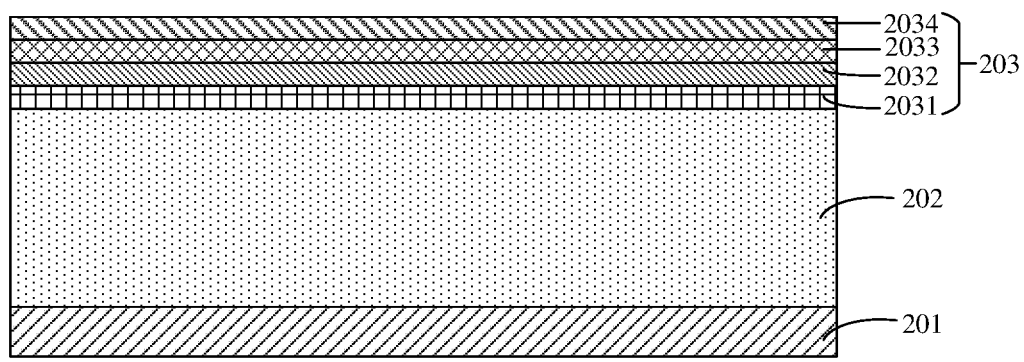
FIG. 2 is a schematic structural diagram of a backlight module according to an embodiment of the present application.

The backlight module 20 can be received in the accommodation space 103 and can be used to provide a light source for the display panel 40. The backlight module 20 is attached to the bottom wall 101 of the backlight housing 10. Referring to FIG. 2, the backlight module 20 can include a reflective sheet 201, a light guide plate 202, and a brightness enhancement film 203 sequentially stacked from bottom to top. The brightness enhancement film 203 can include a lower diffusion sheet 2031, a lower brightness enhancement sheet 2032, an upper brightness enhancement sheet 2033, and an upper diffusion sheet 2034 which are sequentially stacked from bottom to top. The specific functions of the reflective sheet 201, the light guide plate 202, and the brightness enhancement film 203 are common knowledge, and will not be further described herein.

The bracket 30 is disposed inside the backlight housing 10, and the bracket 30 is disposed at a side of the backlight module 20, and the bracket 30 can be used for placing the display panel 40. The bracket 30 can include a first support portion 301 and a second support portion 302. The first support portion 301 is inserted into the accommodation space 103 and abuts against the bottom wall 101 of the backlight housing 10 for supporting the second support portion 302. Preferably, the first support portion 301 is disposed in parallel with the side wall 102 of the backlight housing 10. The second support portion 302 is disposed on a side of the first support portion 301 away from the bottom wall 101 of the backlight housing 10 and extends toward the display panel 20 and can be used for placing the display panel 40. It should be noted that the second support portion 302 and the first support portion 301 are perpendicular to each other.

In some embodiments, a buckle structure can be disposed on the bottom wall 101 of the backlight housing 10 and the first support structure 301 of the bracket 30, and the first support structure 301 and the bottom wall 101 are clamped by the buckle structure. It is also possible to add a fixing tape between the first support structure 301 and the bottom wall 101, and the first support structure 301 and the bottom wall 101 are fixedly connected by a fixing tape.

It should be noted since the brightness enhancement film 203 expands when the light is subjected to the reinforcing work, it is damaged by the pressing of the bracket 30 during the expansion of the brightness enhancement film 203. Therefore, it is necessary to reserve a buffer space between the backlight module 20 and the bracket 30. Specifically, an interspace 21 can be provided between the backlight module 20 and the backlight housing 10 and serves as a buffer space.

The display panel 40 is disposed on the bracket 30. The display panel 40 is disposed on the second support portion 302. The display panel 40 can be used to display an image. In some embodiments, the display panel 40 can be fixedly connected to the second support portion 302 of the bracket 30 by a fixing tape 70.

The cover plate 50 is disposed on the display panel 40. The cover plate 50 can be used to protect the display panel 40. In some embodiments, the cover plate 50 can be fixedly connected to the display panel 40 by an optical adhesive 80. A gap 90 is provided between a surface of the cover plate 50 facing the backlight housing 10 and a surface of the side wall of the backlight housing 10 facing the cover plate 50.

Figure 3:
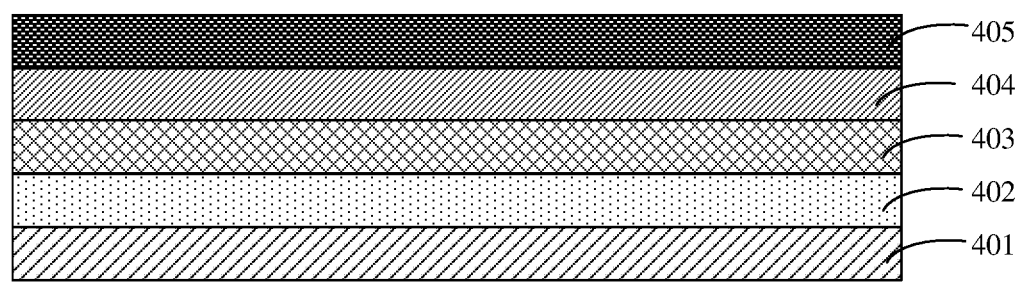
FIG. 3 is a schematic structural diagram of a display panel according to an embodiment of the present application.

The flexible circuit board 60 is electrically connected to the display panel 40 through the gap 90. The flexible circuit board 60 can be used to provide a displaying power to the display panel 40. Referring to FIG. 3, the display panel 40 can include a lower polarizer 401, a thin film transistor substrate 402, a liquid crystal layer 403, a color filter substrate 404, and an upper polarizer 405 sequentially stacked from bottom to top. It should be noted that the flexible circuit board 60 is electrically connected to the display panel 40 through the thin film transistor substrate 402.

The external moisture, dust, and the like can enter an interior of the display module 1 through the gap 90, affecting the operational reliability of the display module 1.

In order to prevent external moisture, dust, and the like from entering the interior of the display module 1 through the gap 90. In the embodiment of the present application, a first sealing structure 91 is disposed between the flexible circuit board 60 and the surface of the cover plate 50 facing the backlight housing 10, and a second sealing structure 92 is disposed between the flexible circuit board 60 and the surface of the side wall 102 of the backlight housing 10 facing the cover plate 50, so as to seal the gap 90. The external water vapor, dust, and the like are prevented from entering the interior of the display module 1 through the gap 90.

A side of the first sealing structure 91 close to the flexible circuit board 60 and a side of the first sealing structure 91 close to the surface of the cover plate 50 facing the backlight housing 10 are sticky. Therefore, the first sealing structure 91 can adhere to the side of the flexible circuit board 60 close to first sealing structure 91 and the side of the first sealing structure 91 close to the surface of the cover plate 50 facing the backlight housing 10, which is not easy to fall off, and the stability of the first sealing structure 91 is increased. A side of the second sealing structure 92 close to the flexible circuit board 60 and a side of the second sealing structure 92 close to the surface of the side wall 102 of the backlight housing 10 facing the cover plate 50 are sticky. Therefore, the second sealing structure 92 can adhere to the side of the flexible circuit board 60 close to first sealing structure 91 and the side of the second sealing structure 92 close to the surface of the side wall 102 of the backlight housing 10 facing the cover plate 50, which is not easy to fall off, and the stability of the first sealing structure 91 is increased.

In some embodiments, in order to increase the sealing performance of the first sealing structure 91 and the second sealing structure 92, the first sealing structure 91 and the second sealing structure 92 can be made of materials having stretchability. For example, sealing foam and the like.

As can be seen from the above embodiment, the first sealing structure 91 is disposed between the flexible circuit board 60 and the surface of the cover plate 50 facing the backlight housing 10. The second sealing structure 92 is disposed between the flexible circuit board 60 and the surface of the side wall 102 of the backlight housing 10 facing the cover plate 50. And the flexible circuit board 60 is electrically connected to the thin film transistor substrate 402 of the display panel 40.

In this regard, since the first sealing structure 91 and the second sealing structure 92 are stretchable, a thickness of the first sealing structure 91 can be set to be greater than or equal to a sum of a thickness of the color filter substrate 403, a thickness of the liquid crystal layer 404, and a thickness of the upper polarizer 405. A thickness of the second sealing structure 92 is set to be greater than or equal to a sum of a thickness of the fixing tape 70, a thickness of the lower polarizer 401, and a thickness of the thin film transistor substrate 402.

In a specific implementation, the first sealing structure 91 and the second sealing structure 92 can be correspondingly disposed in a compressed state between the flexible circuit board 60 and the surface of the cover plate 50 facing the backlight housing 10, and between the flexible circuit board 60 and the surface of the side wall 102 of the backlight housing 10 facing the cover plate 50 by applying an external force. At this time, once the external force is removed, the first sealing structure 91 and the second sealing structure 91 are stretched, and the first sealing structure 91 is completely filled a gap between the flexible circuit board 60 and the surface of the cover plate 50 facing the backlight housing 10, and the second sealing structure 92 is completely filled a gap between the flexible circuit board 60 and the surface of the side wall 102 of the backlight housing 10 facing the cover plate 50.

In the present embodiment, by providing a first sealing structure 91 disposed between the flexible circuit board 60 and the surface of the cover plate 50 facing the backlight housing 10 and a second sealing structure 92 disposed between the flexible circuit board 60 and the surface of the side wall 102 of the backlight housing 10 facing the cover plate 50, which isolates the external water vapor and dust from entering the interior of the display module 1, thereby improving the dustproof and waterproof capabilities of the display module 1, and further improving reliability of the display module 1.

In the above embodiments, the description of each embodiment has its own emphasis, and the details that are not detailed in a certain embodiment can be referred to the related descriptions of other embodiments.

A display module provided by the embodiment of the present application is described in detail. The specific examples are used herein to explain the principles and embodiments of the present application. The description of the above embodiments is only used to help understand the technical solution and its core idea of the present application. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display module, comprising:
   a backlight housing comprising a bottom wall and a side wall, the bottom wall and the side wall enclosed as an accommodation space;
   a backlight module received in the accommodation space;
   a bracket disposed in the backlight housing and disposed at a side of the backlight module;
   a display panel disposed on the bracket;
   a cover plate disposed on the display panel, wherein a gap is provided between a surface of the cover plate facing the backlight housing and a surface of the side wall of the backlight housing facing the cover plate;
   a flexible circuit board electrically connected to the display panel through the gap;
   a first sealing structure disposed between the flexible circuit board and the surface of the cover plate facing the backlight housing; and
   a second sealing structure disposed between the flexible circuit board and the surface of the side wall of the backlight housing facing the cover plate.

2. The display module of claim 1, wherein a side of the first sealing structure close to the flexible circuit board and a side of the first sealing structure close to the surface of the cover plate facing the backlight housing are sticky.

3. The display module of claim 1, wherein a side of the second sealing structure close to the flexible circuit board and a side of the second sealing structure close to the surface of the side wall of the backlight housing facing the cover plate are sticky.

4. The display module of claim 1, wherein the bracket comprises a first support portion and a second support portion, the first support portion is inserted into the accommodation space and abuts against to the bottom wall, and the second support portion is disposed on a side of the first support portion away from the bottom wall and extends toward the display panel.

5. The display module of claim 4, wherein the first support portion is disposed in parallel with the side wall of the backlight housing.

6. The display module according to claim 4, wherein the first support portion and the second support portion are disposed perpendicular to each other.

7. The display module of claim 4, further comprising a fixing tape disposed between the second support portion and the display panel.

8. The display module of claim 7, wherein the display panel comprises a lower polarizer, a thin film transistor substrate, a liquid crystal layer, a color filter substrate, and an upper polarizer sequentially stacked from bottom to top, and the flexible circuit board is electrically connected to the thin film transistor substrate.

9. The display module according to claim 7, wherein the second sealing structure is stretchable, a thickness of the second sealing structure is greater than or equal to a sum of a thickness of the fixing tape, a thickness of the lower polarizer, and a thickness of the thin film transistor substrate.

10. The display module of claim 7, further comprising an optical adhesive disposed between the display panel and the cover plate.

11. The display module of claim 10, wherein the first sealing structure is stretchable, and a thickness of the first sealing structure is greater than or equal to a sum of a thickness of the color filter substrate, a thickness of the liquid crystal layer, a thickness of the upper polarizer, and a thickness of the optical adhesive.

12. The display module of claim 4, wherein the backlight module is attached to the bottom wall of the backlight housing, and an interspace is provided between the backlight module and the bracket.

13. The display module of claim 1, wherein the first sealing structure is a sealed foam.

14. The display module of claim 1, wherein the second sealing structure is a sealed foam.

15. The display module of claim 1, wherein the backlight module comprises a reflective sheet, a light guide plate, and a brightness enhancement film sequentially stacked from bottom to top.

16. The display module of claim 15, wherein the brightness enhancement film comprises a lower diffusion sheet, a lower brightness enhancement sheet, an upper brightness enhancement sheet, and an upper diffusion sheet sequentially stacked from bottom to top.

17. A display module, comprising:
a backlight housing comprising a bottom wall and a side wall, the bottom wall and the side wall enclosed as an accommodation space;
a backlight module received in the accommodation space;
a bracket disposed in the backlight housing and disposed at a side of the backlight module;
a display panel disposed on the bracket;
a cover plate disposed on the display panel, wherein a gap is provided between a surface of the cover plate facing the backlight housing and a surface of the side wall of the backlight housing facing the cover plate;
a flexible circuit board electrically connected to the display panel through the gap;
a first sealing structure disposed between the flexible circuit board and the surface of the cover plate facing the backlight housing; and a second sealing structure disposed between the flexible circuit board and the surface of the side wall of the backlight housing facing the cover plate, and the first sealing structure and the second sealing structure are stretchable sealed foam.

* * * * *